Figure 1:
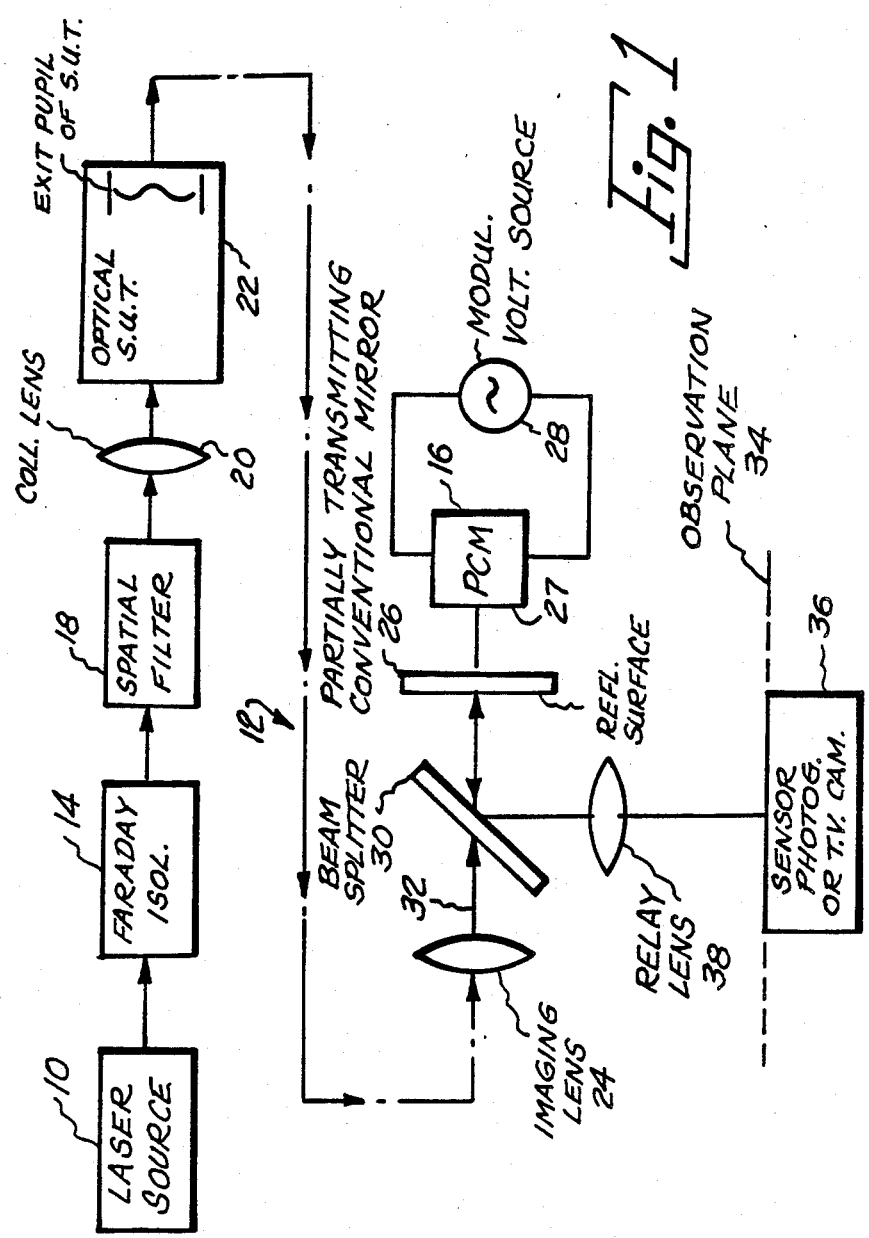

United States Patent [19]
Gauthier et al.

[11] Patent Number: 4,938,596
[45] Date of Patent: Jul. 3, 1990

[54] PHASE CONJUGATE, COMMON PATH INTERFEROMETER

[75] Inventors: Daniel J. Gauthier; Robert W. Boyd; Robert Jungquist, all of Rochester; Laurie L. Voci, Farmington, all of N.Y.

[73] Assignee: The University of Rochester, Rochester, N.Y.

[21] Appl. No.: 293,900

[22] Filed: Jan. 5, 1989

[51] Int. Cl.$^5$ .............................................. G01B 9/02
[52] U.S. Cl. ..................................... 356/360; 356/359
[58] Field of Search ........................ 356/345, 359, 360

[56] References Cited

U.S. PATENT DOCUMENTS 4,210,400 7/1980 Misek .
4,280,764 7/1981 Sica, Jr. et al. .

(List continued on next page.)

OTHER PUBLICATIONS

F. A. Hopf, "Interferometry Using Conjugate-Wavefront Generation", J. Opt. Soc., Am. 70, pp. 1320–1323 (1980).

I. Bar-Joseph, A. Hardy, Y. Katzir, Y. Silberberg, "Low-Power Phase-Conjugate Interferometry", Opt. Lett., 6, pp. 414–416 (1981).

J. Feinberg, "Interferometer with Self-Pumped Phase-Conjugate Mirror", Opt. Lett., 8, pp. 569–571 (1981).

W. L. Howes, "Large Aperture Interferometer with Phase-Conjugate Self-Referencing Beam", Appl. Opt., 25, pp. 3167–3170 (1986).

(List continued on next page.)

*Primary Examiner*—Vincent P. McGraw
*Assistant Examiner*—S. A. Turner
*Attorney, Agent, or Firm*—Martin LuKacher

[57] ABSTRACT

A phase conjugate interferometer has a partially reflective conventional mirror placed in front of and in close proximity to a phase conjugate mirror using internally self pumped phase conjugation in barium titanate or other photorefractive material. The reflective surface may be the surface of the phase conjugate mirror. An optical system under test is illuminated with coherent light and the wavefront at the exit pupil thereof is imaged through a beam splitter onto the reflective surface (imaging being unnecessary if the distance between the exit pupil and the reflective surface is sufficiently small that negligible diffraction occurs over that distance). Part of the wavefront is reflected at the reflective surface of the partially reflecting conventional mirror. The transmitted portion of the wavefront is incident on the phase conjugate mirror where a wavefront reversed replica of the incident wave is produced and reflected. The two reflected waves (from the conventional and from the phase conjugate mirror travel back towards the exit pupil. The interference pattern which characterizes the incident wavefront is formed at the reflective surface of the conventional mirror. The interferometer is an essentially perfect common path interferometer for the following reason: the only path that is not common to the two waves is the round trip path between the conventional and phase conjugate mirrors, which has zero effective path due to the wavefront reversal properties of phase conjugate mirrors. The pattern is deflected by the beam splitter to an observation plane. The pattern is imaged, as by a relay lens, on the observation plane where the interference fringes of the pattern can be examined or recorded on photographic film or displayed with a television camera. That portion of the optical path between the reflective surface and the phase conjugate mirror (which provides the reference arm) of the interferometer is not subject to environmental effects (turbulence, thermally induced pathlength changes, etc.) and the path through which the reflected object beam travels to the location where the interference pattern with the reference beam is formed is extremely small and not affected by environmental effects. Accordingly, the interferometer is robust and can be made extremely compact.

20 Claims, 2 Drawing Sheets

U.S. PATENT DOCUMENTS

| | | |
|---|---|---|
| 4,492,468 | 1/1985 | Huignard et al. . |
| 4,571,080 | 2/1986 | Papuchon et al. . |
| 4,575,245 | 3/1986 | Borde . |
| 4,627,731 | 12/1986 | Waters et al. ............ 356/345 |
| 4,637,725 | 1/1987 | Stefanov et al. . |
| 4,648,092 | 3/1987 | Ewbank et al. . |
| 4,682,025 | 7/1987 | Livingston et al. ......... 356/363 |
| 4,718,749 | 1/1988 | Chiou et al. . |
| 4,721,362 | 1/1988 | Brody et al. . |
| 4,762,394 | 8/1988 | Kwong et al. . |
| 4,765,740 | 8/1988 | Fischer . |
| 4,767,195 | 8/1988 | Pepper . |
| 4,820,049 | 4/1989 | Biegen ............ 356/360 |

OTHER PUBLICATIONS

Malacara, ed., "Optical Shop Testing", John Wiley, New York (1978).

Lisson, "Optical Alignment & Pointing Control w/Nonlinear Optical Materials", Nov. 15–17, 1988, pp. 31 et seq.

PHASE CONJUGATE, COMMON PATH INTERFEROMETER

DESCRIPTION

The present invention relates to interferometers and more particularly to interferometers using a phase conjugate mirror (PCM) which provides a phase conjugate replica of the object beam which contains the wavefront to be characterized as the reference beam and a partially reflective surface in front of and in close proximity to the PCM or a surface thereof which reflects the object beam so that the reflected reference beam from the PCM and the object beam interfere over a common path at the reflective surface and provide an interference pattern which is imaged on an observation plane where the interference fringes characterizing the wavefront can be examined.

The present invention is useful in testing optical systems, for example determining the aberrations in lenses of an optical system under test. The system is also useful in distance measurement by interferometry as well as in other applications of interferometry.

Interferometers have been proposed which utilize phase conjugate mirrors. U.S. Pat. No. 4,280,764 issued Jul. 28, 1981 describes a Michelson type interferometer using a PCM in one arm. Like other phase conjugate interferometers there is another arm which provides another beam which interferes with the phase conjugate reflected from the PCM, usually at a beam splitter. While aberrations, which may be due to environmental effects, do not perturb the arm defined by the PCM, the other arm is subject to environmental effects. Accordingly, such known PCM interferometers are not stable and the interference fringes which they produce jitter and are difficult to examine, except under extremely stable conditions. Any vibration, thermally induced pathlength changes, or turbulence (such as wind which passes through the other arm of the interferometer, even when a door is opened) adversely affects the operation of the interferometer. There are, of course interferometers which do not use phase conjugate mirrors and these are very sensitive to environmental disturbances. One such interferometer is known as the Fizeau interferometer which is described in the text "Optical Shop Testing", D. P. Malacara, Ed. John Wiley, New York (1978), pp. 18–36. Some of the principles of the Fizeau type interferometer are incorporated in the interferometer used in carrying out this invention.

Accordingly, it is the principal object of the present invention to provide an improved phase conjugate interferometer which is robust and less sensitive to environmental effects than interferometers heretofore suggested whether of the phase conjugate or non-phase conjugate type.

It is another object of the present invention to provide an improved phase conjugate interferometer which may be extremely compact and occupy a very small space.

It is a still further object of the present invention to provide an improved Fizeau interferometer utilizing a phase conjugate mirror.

Briefly described, an interferometer embodying the invention characterizes a wavefront which may be obtained by a beam of coherent light passing through an optical system under test. A partially reflective mirror (PRM) is provided which is defined by a partially reflective surface on which the wavefront is incident and through which the wavefront is transmitted. The transmitted wavefront is incident on a phase conjugate mirror (PCM). The surface of the PCM on which the wavefront is incident can provide the partially reflective surface of the PRM. Then the interferometer can be made extremely compact. The phase conjugate of the wavefront is reflected to form an interference pattern at the partially reflective surface with the wavefront reflected by the PRM at that surface. Means are provided for forming an image of the pattern. This image may be formed at an observation plane by reflecting the light from the pattern off a beam splitter through a relay lens.

More particularly, and in accordance with a presently preferred embodiment, the invention provides a phase conjugate interferometer having a partially reflective conventional mirror placed in front of and in close proximity to a phase conjugate mirror using internally self pumped phase conjugation in barium titanate or other non-linear optical or photorefractive material. The reflective surface may be the surface of the phase conjugate mirror. An optical system under test is illuminated with coherent light and the wavefront at the exit pupil thereof is imaged through a beam splitter on the reflective surface (imaging being unnecessary if the distant between the exit pupil and the reflective surface is sufficiently small that negligible diffraction occurs over that distance). Part of the wavefront is reflected at the reflective surface of the partially reflecting conventional mirror. The transmitted portion of the wavefront is incident on the phase conjugate mirror where a wavefront reversed replica of the incident wave is produced and reflected. The two reflected waves (from the conventional and from the phase conjugate mirror) travel back towards the exit pupil. The interference pattern which characterizes the incident wavefront is formed at the reflective surface of the conventional mirror. The interferometer is an essentially perfect common path interferometer for the following reason: the only path that is not common to the two waves is the round trip path between the conventional and phase conjugate mirrors, which has zero effective path due to the wavefront reversal properties of phase conjugate mirrors. The pattern is deflected by the beam splitter to an observation plane. The pattern is imaged, as by a relay lens, on the observation plane where the interference fringes of the pattern can be examined or recorded on photographic film or displayed with a television camera. That portion of the optical path between the reflective surface and the phase conjugate mirror (which provides the reference arm) of the interferometer is not subject to environmental effects (turbulence, thermally induced pathlength changes, etc.) and the path through which the reflected object beam travels to the location where the interference pattern with the reference beam is formed is extremely small and not affected by environmental effects. Accordingly, the interferometer is robust and can be made extremely compact.

Figure 2:
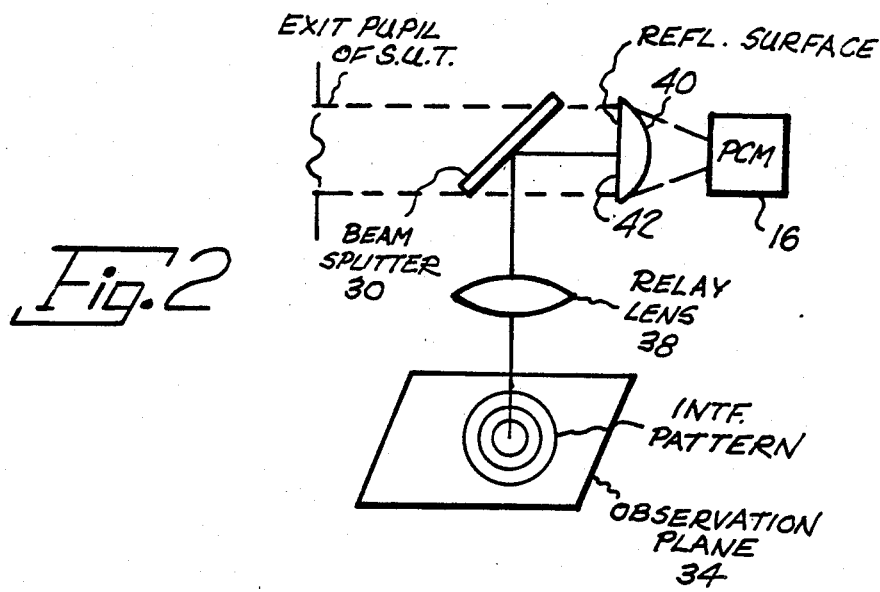
Figure 3:
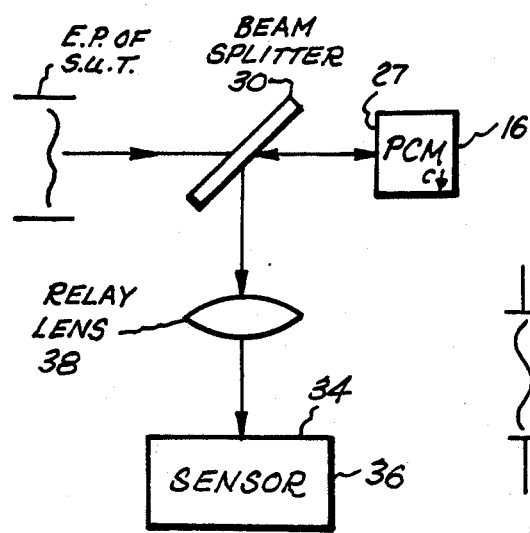
Figure 4:
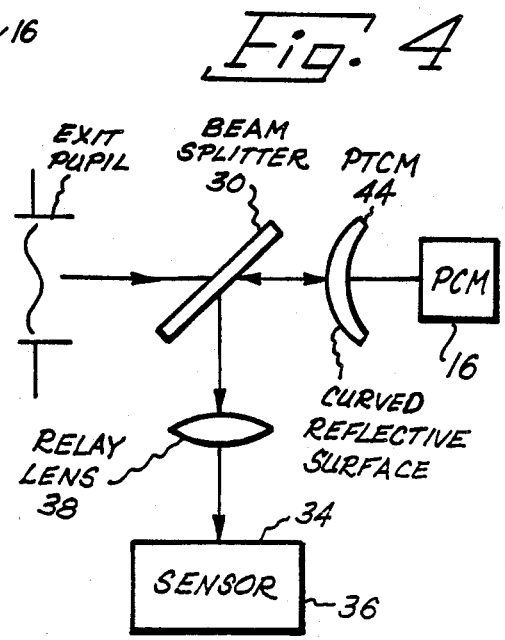

The foregoing and other objects and features of the invention as well as the presently preferred embodiments thereof will become more apparent from a reading of the following description in connection with the accompanying drawings in which:

FIG. 1 is a block diagram schematically illustrating an embodiment of the invention; and FIGS. 2, 3 and 4 are block diagrams illustrating other embodiments of the invention.

Referring to FIG. 1 there is shown a source of coherent light 10. This source may be a laser. It has been found that a single transverse, single longitudinal mode argon ion laser operated at a wavelength of 515 nm which delivers approximately 50 mW is suitable. It should be appreciated that the interferometer system 12 may operate with any source of coherent light whether of known or unknown wavelength.

The output beam of the laser is passed through a Faraday isolator 14, which may be of conventional design with polarizer and analyzer ahead of and in back of a body of magneto-optic material (i.e., a material that produces the Faraday effect) in a magnetic field. This isolator 14 prevents feedback of light back into the laser 10 which may be reflected back from the phase conjugate mirror 16 of the interferometer system 12. The beam may be passed to a spatial filter 18 in the form of a lens followed by an aperture in which the beam is focused in order to precondition the waveform and reduce any aberrations therein. The output of the filter 18 is collimated by a collimating lens 20 or other collimating optics and passed through an optical system under test (SUT) 22. This may be any optical system which affects the wavefront such as a lens or lens system (e.g. a telescope). The system is tested and aberrations therein determined by characterizing the wavefront emanating from its exit pupil. The exit pupil is the image of the aperture stop of the SUT as seen by an observer in the output space of the system looking backwards into the SUT. It is the wavefront at the exit pupil which is characterized by the interferometer system 12. This wavefront is imaged by an imaging lens 24 and the image thereof is characterized by the interferometer system 12. The imaging lens, 24, is not needed if it is acceptable to determine the wavefront structure of the exiting wave at the plane of a surface of a 26. The imaging lens counteracts the diffraction (spreading apart) of the wavefront between the exit pupil and the location in the system 12 where the interference pattern is formed., This is the reflective surface of the mirror 26 which is a partially transmitting conventional mirror 26 in the system 12. If this mirror was at a distance from the exit pupil sufficiently small that negligible diffraction occurs in that distance, the imaging lens would not be needed. This distance would be less than $D^2/lamda$ where D is the diameter of the exit pupil and lamda is the wavelength of the laser light.

In the interferometer system, the PCM 16 may be a crystal of non-linear photorefractive material. Barium titanate may be used as the crystal. The axis of symmetry or c-axis of the crystal should be within 30° of parallelism with the surface 27 of the PCM on which the wavefront is incident. In the event that improvement in sensitivity of measurement (higher resolution of the fringes of the interference pattern) is desired, AC interferometric techniques may be used by modulating the phase of the conjugate wave reflected from the PCM by applying a modulating voltage to the PCM. A modulating voltage source 28, for example of 1000 Hz may be applied to the crystal for this purpose. It will be understood that the use of the source and the AC interferometric techniques is entirely optional. Other photorefractive materials such as strontium barium niobate may also be used. The partially transmitting conventional mirror is disposed in front of the PCM and may be spaced very close to the surface 27 thereof. The spacing may be larger, but should not exceed the coherence length of the laser. Close spacing is preferred since it provides a compact design. Four wave mixing, rather than self pumped phase conjugation may be used, but is not preferred, since the wavelength of the light of this wavefront to be characterized must be known.

The partially transmitting conventional mirror 26 as shown in FIG. 1 is a plate of glass. Its reflective surface may be the surface on which the wavefront is incident, the reflection being provided by the inherent Fresnel reflection (approximately 4%) from the surface of the plate of glass. A thin film optical coating may be used to provide the reflective surface. The coating should be selected such that the percentage of the illumination reflected is approximately equal to the intensity of the phase conjugate reflection from the PCM.

A beam splitter 30 inclines so that it deflects the light from the reflective surface perpendicular to the optical path 32 to an observation plane 34. This observation plane may be defined by a sheet of material on which the interference pattern becomes visible or it may be defined by a sensor 36, either a photographic film or plate or a T.V. camera which is then, of course, connected to a television display on which the interference pattern will appear. This display is synchronized with the modulating voltage when AC interferometric techniques are used. Imaging means, such as a relay lens 38, provides an image of the reflective surface (in the immediate vicinity of which the interference pattern appears) on the observation plane.

The wavefront at the exit pupil passes through the beam splitter 30 and then through the partially transmitting mirror. Part of the incident wavefront is reflected at the reflective surface of the mirror 26. The transmitted portion of the wavefront is incident on the PCM 16 where a wavefront reversed replica of the incident wavefront is produced. The reflected waves exist at the reflective surface of the mirror 26 where the interference pattern is formed. This is the plane where the reference wavefront from the PCM and the object wavefront interfere and where these two wavefronts are phase conjugates of each other. The interference pattern travels back towards the exit pupil and is deflected by the beam splitter. The relay lens forms a real image of the pattern on the observation plane.

Referring to FIG. 2, there is shown a system which is especially useful when the PCM crystal is small. The partially transmitting conventional mirror is provided by a plano-convex lens 40 which focuses the light on the surface of the PCM. The partially reflective surface is the planar surface 42 of the lens 40.

Referring to FIG. 3, an extremely compact embodiment of the invention is provided where the conventional mirror is provided by the partially transmissive reflecting surface 27 of the PCM. Part of the incident light is reflected from the front surface of the crystal and subsequently interferes with the light generated inside the crystal by the self-pump phase conjugation process. The interference pattern is formed at the surface 27 and is imaged by the relay lens 38 on the observation plane 34.

The surface 27 may be tilted by tilting the PCM crystal 16 in order to form tilt fringes for a reference wave front from a SUT having no aberrations. Then this pattern can be compared with the pattern with a system to be tested in place and the aberrations determined by comparing the location of the fringes of the two patterns. The tilt may be very slight, suitably a few degrees from perpendicular to a beam path 32.

Referring to FIG. 4, there is shown a curved partially transmissive conventional mirror 44 having a curved reflective surface. This may be a curvature designed to be sufficient to null out any overall curvature of the incident wavefront. This makes it easier to detect deviations in the wavefront. For example, if the SUT was a spherical lens to be tested to determine any aberrations therein, the partially transmissive conventional mirror 44 would have a spherical curvature equal to the overall curvature of the spherical lens. Then the overall curvature would be nulled in the wavefronts which interfere to form the interference pattern.

From the foregoing description, it will be apparent that there has been provided improved phased conjugate interferometers which are robust and which may be designed to be extremely compact. Variations and modifications in the herein described interferometers within the scope of the invention will undoubtedly suggest themselves to those skilled in the art. Accordingly, the foregoing description should be taken as illustrative and not in a limiting sense.

We claim:

1. An interferometer for characterizing a wavefront which comprises a partially reflective mirror (PRM) defined by a partially reflective surface on which said wavefront is incident and through which said waveform is transmitted without deflection from a path along which said wavefront propagates, a phase conjugate mirror (PCM) along said path on which said waveform which is transmitted through said PRM is incident and from which the phase conjugate of said wavefront is reflected to form an interference pattern at said surface with the wavefront reflected by said PRM, and means for forming an image of said pattern.

2. The interferometer according to claim 1 wherein said image forming means is a relay lens.

3. The interferometer according to claim 2 further comprising an observation plane, a beam splitter through which said wavefront is transmitted to said PRM and from which said pattern is deflected to said plane, said relay lens being disposed between said beam splitter and said plane for forming said image of said pattern on said plane.

4. The interferometer according to claim 3 wherein said observation plane is defined by a photoresponsive sensor.

5. The interferometer according to claim 4 wherein said sensor is selected from the group consisting of a photosensitive film and TV camera.

6. The interferometer according to claim 1 wherein said PRM is a light transmissive plate having a partially reflective planar surface which provides said partially reflective surface.

7. The interferometer according to claim 1 wherein said PRM is a light transmissive body having a partially reflective surface which is a curved surface having a curvature corresponding to the curvature of said wavefront.

8. The interferometer according to claim 1 wherein said wavefront eminates from an optical system under test having an exit pupil, said PRM is a lens which images said exit pupil on said PCM, said lens having a surface which is partially reflective facing said exit pupil.

9. The interferometer according to claim 8 wherein said lens is a plano-convex lens having a planar surface providing said partially reflective surface and which faces said exit pupil and a curved surface facing said PCM.

10. The interferometer according to claim 1 wherein said PRM is provided by said PCM, said partially reflective surface being the surface of said PCM on which said waveform is incident.

11. The interferometer according to claim 1 wherein said wavefront eminates from an optical system under test having an exit pupil which is spaced from said PRM a distance over which the diffraction of said wavefront can occur, and a lens between said exit pupil and said PRM which forms an image of said exit pupil on said partially reflective surface.

12. The interferometer according to claim 11 further comprising a beam splitter between said lens and said PRM oriented to deflect light travelling in a direction from said partially reflective surface to an observation plane, said means for forming an image of said pattern being a relay lens between said beam splitter and said observation plane.

13. The interferometer according to claim 11 wherein said distance is greater than $D^2/\lambda$ where D is the diameter of said exit pupil and lamda is the wavelength of the light of said wave front.

14. The interferometer according to claim 12 further comprising means for generating said wavefront which includes a source of monochromatic light, means for collimating said light into a beam which is transmitted through said system under test and which eminates from the exit pupil thereof, said beam passing through said beam splitter and then through said PRM to said PCM, said beam being reflected by said PCM to form said pattern at said partially reflective surface and said beam being deflected by said beam splitter and imaged by said relay lens on said observation plane.

15. The interferometer according to claim 14 wherein said generating means further comprises a spatial filter between said source and said collimating means.

16. The interferometer according to claim 15 wherein said generating means further comprises a Faraday isolator between said source and said spatial filter.

17. The interferometer according to claim 1 wherein said partially reflective surface of said PRM is spaced immediately adjacent to said PCM.

18. The interferometer according to claim 1 wherein a laser provides the light forming said wavefront, said PRM being spaced less than the coherence length of the light from said laser from said PCM.

19. The interferometer according to claim 1 wherein said PCM is crystal of photorefractive material having a c-axis and a surface on which said wavefront is incident, said c-axis being disposed within 30° of parallelism with the surface of said crystal on which said wavefront is incident.

20. The interferometer according to claim 1 wherein said crystal is of material selected from the group consisting of barium titanate and strontium barium niobate.

* * * * *